United States Patent [19]

Ohm

[11] Patent Number: 5,322,326
[45] Date of Patent: Jun. 21, 1994

[54] TRIGGERING MECHANISM FOR INFLATING AN AIR BAG

[76] Inventor: Hang-Sup Ohm, Samho Garden Apartment 11 Dong 506Ho, 30-2 Banpo-1Dong, Seocho-Ku, Seoul, Rep. of Korea

[21] Appl. No.: 972,569

[22] Filed: Nov. 6, 1992

[30] Foreign Application Priority Data

Nov. 9, 1991 [KR] Rep. of Korea ............... 91-19000
Jan. 15, 1992 [KR] Rep. of Korea ............... 92-463
May 25, 1992 [KR] Rep. of Korea ............... 92-9087

[51] Int. Cl.[5] ...................... B60R 21/26; B60R 21/32
[52] U.S. Cl. ................................ 280/737; 180/282; 222/5; 280/730 R; 280/743 R
[58] Field of Search .................. 280/737, 734, 730 R, 280/730 A, 728 R, 806, 743; 180/282; 222/5; 5/644, 654, 449, 453

[56] References Cited

U.S. PATENT DOCUMENTS

| | | | |
|---|---|---|---|
| 2,675,144 | 4/1954 | Elikann | 222/5 |
| 2,707,605 | 5/1955 | Sieverts | 222/5 X |
| 3,017,221 | 1/1962 | Emery | 5/644 X |
| 3,749,282 | 7/1973 | Day et al. | 280/734 X |
| 3,767,227 | 10/1973 | Furusho et al. | 222/5 X |
| 3,883,156 | 5/1975 | Frazier | 280/734 |
| 3,894,750 | 7/1975 | Eckels | 280/737 X |
| 3,897,961 | 8/1975 | Leising et al. | 280/730 A |
| 4,191,310 | 3/1980 | Bernhardt et al. | 222/5 |
| 5,058,635 | 10/1991 | Mackal | 222/5 X |

FOREIGN PATENT DOCUMENTS 4013046 10/1991 Fed. Rep. of Germany ...... 280/734
0064851 3/1988 Japan .................................. 280/743

Primary Examiner—Margaret A. Focarino
Assistant Examiner—Peter C. English
Attorney, Agent, or Firm—Nawrocki, Rooney & Sievertson

[57] ABSTRACT

An air bag type of passenger protector equipped in a vehicle. The passenger protector comprises a compressed gas supplying assembly and an air bag receiving assembly for receiving an air bag which is connected to the compressed gas supplying assembly by means of a power hose. The compressed gas supplying assembly comprises a compressed gas container, a movable weight, a hinged link, a hinged lever and a perforating pin. If there occurs a vehicle collision, the weight is reliably operated in response to a mechanical shock caused by the vehicle collision and this causes the hinged link and the hinged lever to be sequentially turned and in turn causes the perforating pin to be pushed so as to perforate a closed tip of the compressed gas container. As the closed tip of the gas container is perforated by the perforating pin, the compressed gas rapidly blows out of the gas container and into the air bag having an outer shape which is coincident with the human body by forming an upper junction point, a pair of middle junction points and a U-shaped junction line, thereby efficiently preventing the passenger from being directly struck on a vehicle body and, in this respect, protecting the passenger from being injured.

5 Claims, 11 Drawing Sheets

TRIGGERING MECHANISM FOR INFLATING AN AIR BAG

BACKGROUND OF THE INVENTION

1. Field of the Invention

The present invention relates in general to apparatus for protecting passengers from being injured in traffic accidents, and more, particularly to an air bag type of passenger protector installed in a vehicle in which an assembly for supplying a compressed gas is automatically operated in order to cause an air bag to be rapidly filled with a compressed gas in the case of a traffic accident, particularly a vehicle collision. As a result, a passenger is prevented from being directly struck against a vehicle body and protected from being injured.

2. Description of the Prior Art

Known air bag type of passenger protectors installed in vehicles are generally classified into two types: an electronic type and a mechanical type.

The electronic type of passenger protector comprises a shock sensing part (wherein an electronic sensor automatically senses a mechanical shock caused by a vehicle collision and outputs a shock signal), a comparing and determining part (wherein, upon receiving the shock signal outputted from the shock sensing part, a microcomputer determines whether the sensed shock intensity exceeds a predetermined reference shock intensity) and an air bag drive part for filling an air bag with a compressed gas in response to a signal outputted from the comparing and determining part. However, this type of protector has a completed structure due to the aforementioned component parts, and this impairs the productivity and increases the manufacturing cost. As a result, this apparatus has a disadvantage in that it inevitably creates an economical burden for the user such that there is a serious problem in putting it to practical use. Furthermore, in the case of having this type of protector installed in a superannuated vehicle, or in the case of interchanging some of the component parts of the protector for others, an error in operation of the shock sensing part of the protector can occur. As a result this protector has another disadvantage in that it can not be reliably counted upon to operate in the case of occurrence of a vehicle collision. This results in the air bag being unreliably filled with the compressed gas.

A representative embodiment of the mechanical type of known passenger protector is disclosed in Korean Patent Laid-Open Publication No. 91-15452 entitled "Air bag type of apparatus for protecting passengers from being mechanically shocked". The apparatus disclosed in the above Korean document is constructed such that, in response to a mechanical shock caused by a vehicle collision, a weight inertially moves to push an L-shaped lever. This in turn causes a hammer, biased by a spring, to strike a perforating pin. As it is struck by the hammer, the perforating pin punctures a compressed gas container so as to permit the compressed gas to rapidly exit the container and into an air bag through a gas flow tube connecting the container to the air bag. As a result the air bag is fully inflated with the compressed gas so as to form an air mattress type of protector for protecting the passenger from being directly struck against the vehicle body. However, it is known that this apparatus has the following disadvantages.

First, the movable weight is constructed to have a perpendicular front end so that the pushing operation thereof for the L-shaped lever is not reliably performed.

Second, there is a structural defect at a contact portion, wherein a contacting end of the L-shaped lever comes in contact with the biased hammer, so that the biased hammer is not reliably locked into or released from, the L-shaped lever.

Third, even though it is intended that the biased hammer strike the perforating pin using a return force of a spring when the hammer is released from the L-shaped lever, it in effect strikes the perforating pin with no reliability and, moreover, damages a front end of the perforating pin. This is because the hammer nearly perpendicularly strikes the perforating pin.

Fourth, the air bag is constructed to be a mattress type so that it is relatively slow to form a desired inflated shape. Furthermore, the inflated outer shape of the air bag is not coincident with the human body so that it may not prevent the passenger from being slightly injured even though it prevents the passenger from being seriously injured in the case of a vehicle collision.

SUMMARY OF THE INVENTION

It is, therefore, an object of the present invention to provide an air bag type of passenger protector installed in a vehicle in which a mechanical shock sensing mechanism permits a compressed gas supplying assembly to be automatically operated in order to cause an air bag to be rapidly filled with compressed gas in the case of occurrence of a traffic accident. In particular a vehicle collision is protected against thereby preventing a passenger from being directly struck against a vehicle body and, protecting the passenger from being injured.

It is another object of the present invention to provide an air bag type of passenger protector installed in a vehicle in which each component part thereof, such as an air bag, is easily and rapidly separated from the others in the case of the occurrence of a vehicle collision.

It is further object of the present invention to provide an air bag type of passenger protector installed in a vehicle, which protector comprises an air bag defining an outer shape which is coincident with the human body, thus effectively reducing the mechanical shock which is imparted to the human body. Further the protector is reliably operated even when it is equipped in a superannuated vehicle, or when one of its component parts is changed for others. And in its operation is thereby prevented.

The above-mentioned objects of the present invention can be accomplished by providing an air bag type of passenger protector comprising a compressed gas supplying assembly for supplying a compressed gas for an air bag, said gas supplying assembly including: an outer frame in which a partition is mounted so as to divide the inner space of the outer frame into two inner spaces; a frame cover for covering the outer frame; a movable weight for automatically moving in an axial direction in response to a mechanical shock caused by a vehicle collision, said movable weight being axially received in an inner space of the frame so as to inertially move forward in response to the mechanical shock and being continuously supported by a supported member which is simply disposed at the back of the movable weight; a compressed gas container for containing a compressed gas; a compressed gas guide member for guiding the compressed gas ejected from the gas container to the air bag, said gas guide member engaging, at an end thereof, a closed tip of the gas container; a perforating pin for perforating the closed tip of the gas container in response to the inertial movement of the movable weight, said perforating pin being normally disposed with its sharp forward end orientated toward the closed tip of the gas container; a hinged lever for pushing the perforating pin so as to cause it to puncture the closed tip of the gas container, said hinged lever always coming, at an end thereof, into contact with a rear end of the perforating pin and being biased by a first biasing member so as to be elastically turned about its hinge shaft when the movable weight inertially moves; and a hinged link for causing, in response to the inertial movement of the movable weight, the hinged lever to be turned about its hinge shaft so as to permit the perforating pin to be pushed, said hinged link being hinged to a seat of the outer frame so as to be turned about its hinged connection, coming at a front end thereof into slidable contact with a front end of the movable weight and allowing the other end of the hinged lever to be normally locked into a middle portion thereof; and an air bag receiving assembly for receiving the air bag, said air bag receiving assembly including: an outer casing having a hole through which a gas inlet pipe of the air bag, which is also connected to the compressed gas supply assembly by means of a power hose, protrudes to the outside of said outer casing; and a cover for covering the outer casing in such a manner that it is easily separated from the outer casing when the air bag is filled with the compressed gas when supplied from the compressed gas supplying assembly through the power hose.

DETAILED DESCRIPTION OF THE PREFERRED EMBODIMENTS

Figure 1:
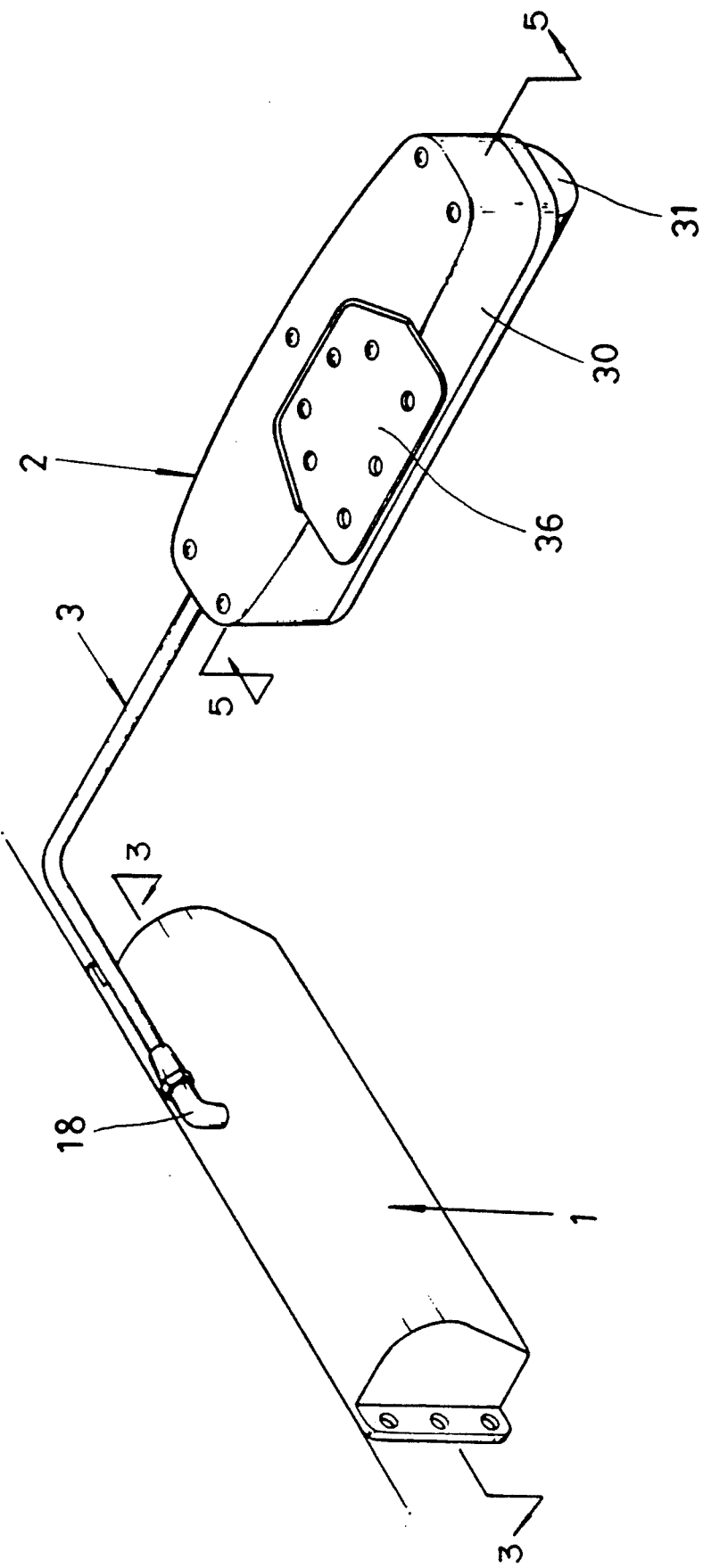
FIG. 1 is a perspective view showing an embodiment of an air bag type of passenger protector in accordance with the present invention.
Figure 7:
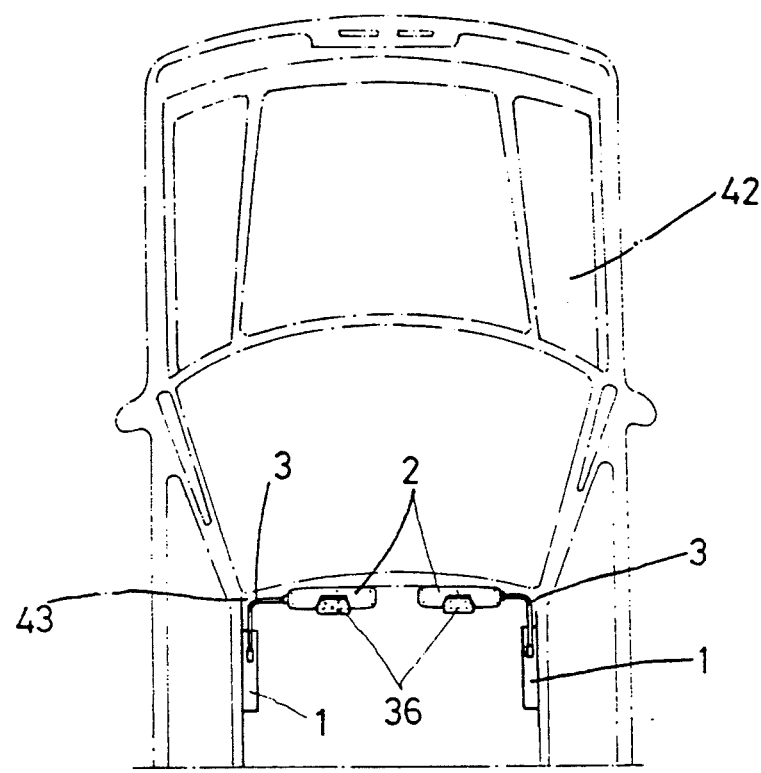
FIG. 7 is a plan view showing an example of installation of the passenger protector of FIG. 1 in a vehicle.

Referring now to FIG. 1, which shows a preferred embodiment of an air bag type of passenger protector according to the present invention, the passenger protector comprises a compressed gas supplying assembly 1 and an air bag receiving assembly 2 which are connected to each other by means of a power hose 3 through which a compressed gas is supplied from the gas supplying assembly to an air bag received in the air bag receiving assembly. This passenger protector is preferably installed at inner front corners of the ceiling of a vehicle as depicted in FIG. 7.

Figure 2:
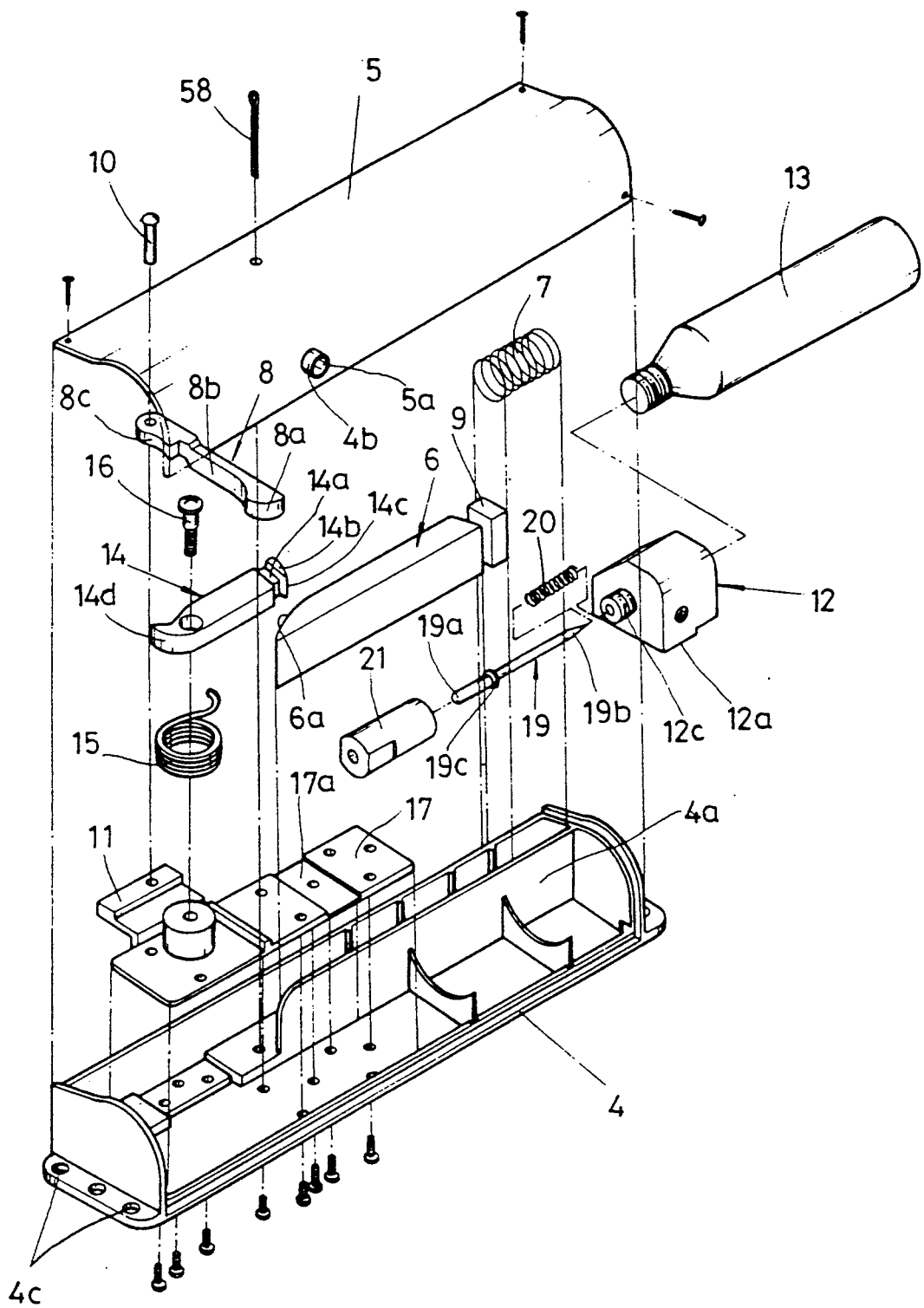
FIG. 2 is an exploded view of an embodiment of a compressed gas supplying assembly of the passenger protector of FIG. 1.
Figure 3:
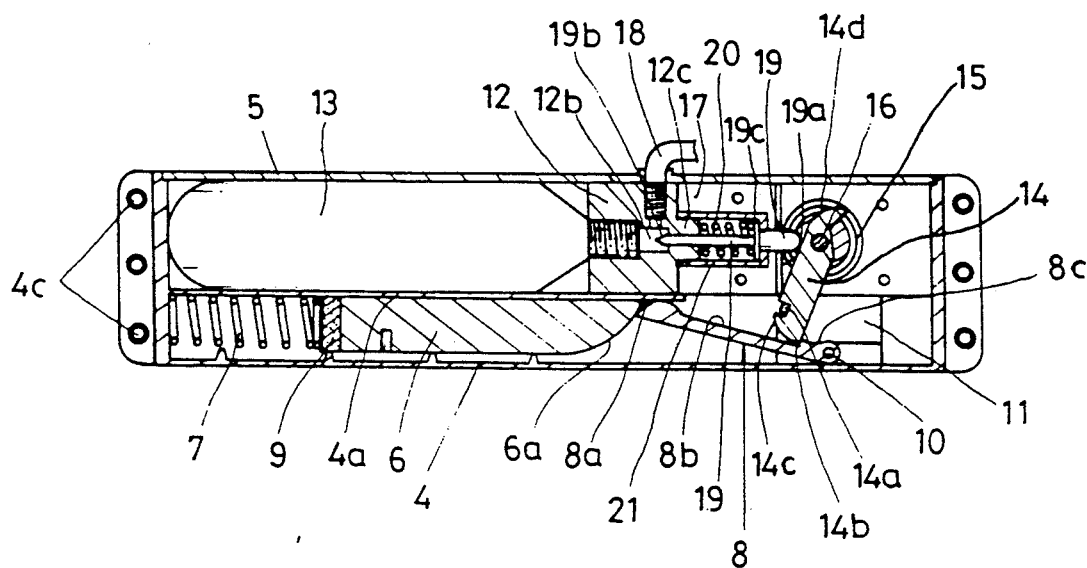
FIG. 3 is a sectioned view of the compressed gas supplying assembly taken along the section line 3—3 of FIG. 1.
Figure 4:
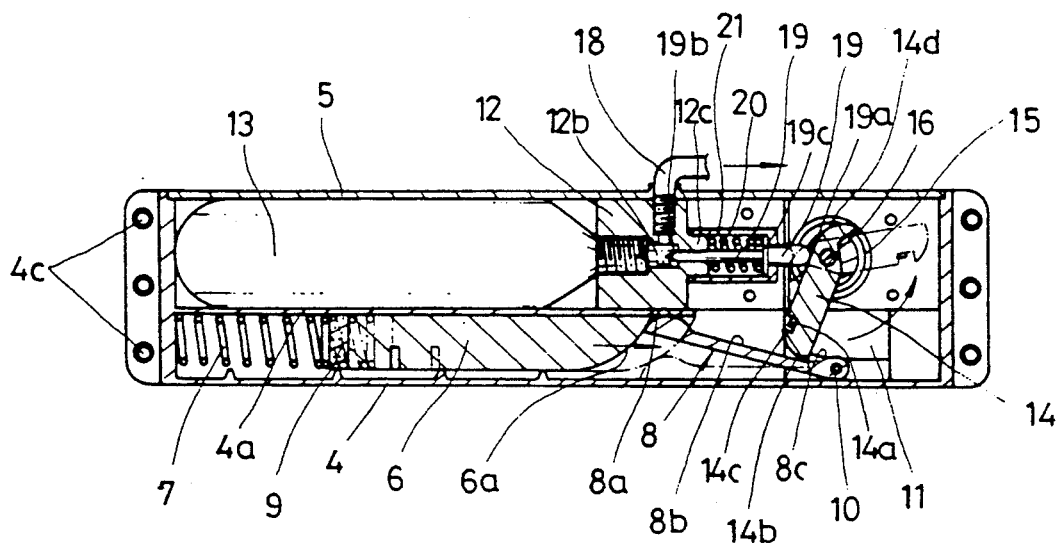
FIG. 4 is a view corresponding to FIG. 3, but showing operation of the compressed gas supplying assembly.

As shown in detail in FIGS. 2 to 4, the compressed gas supplying assembly 1 has an outer casing comprising an outer frame 4 and a cover 5. Outer frame 4 is provided with a longitudinal partition 4a by which the inner space of the frame 4 is divided into two inner longitudinal spaces. One space receives a longitudinal movable weight 6, which is movable in the axial direction and is supported by a support member such as a support spring 7 with a buffer packing 9 interposed between the rear end of the movable weight 6 and the front end of the support spring . At the front of the weight 6, a hinged link 8 is hinged to a seat 11, which is mounted to a bottom surface of the outer frame 4, so as to be elastically turned about its hinged connection 10. The other longitudinal inner space defined by the partition 4a receives a compressed gas guide member 12 which is provided at the rear end thereof with an inner threaded hole into which an outer threaded tip of a compressed gas container 13 threaded in airtight manner.

In addition, a lever 14 is hinged to the seat 11 at the front of the gas guide member 12 so as to be elastically pivoted about its hinge shaft 16 with a torsion coil spring 15, of which one end is supported by the hinged lever 14 and the other end is supported by the seat 11. Lever 14 comes into contact, at its free end, with a side surface of the hinged link 8 and at its hinged-side surface with a rounded rear end 19a of a perforating pin 19. A sharp front end 19b of perforating pin 19 is proximate the closed tip of the gas container 13 with a predetermined distance therebetween.

The outer frame 4 is provided at both ends with a plurality of through holes 4c by which frame 4 is detachably mounted to a corner of an inner ceiling of a vehicle by means of appropriate screw members.

The cover 5 is formed with an exhaust hole 5a, from which a cylindrical pipe 4b extends, and pipe 4b is mounted on the outer frame 4 after the assembly of the component parts of the frame 4 is accomplished.

The movable weight 6 is disposed in the one inner space of the frame 4 in such a manner that it is prevented from moving in the rearward direction by virtue of the support spring 7 which is disposed at the rear of the inner space but can axially advance forward. This weight 6 is constructed to have a curved taper surface 6a at its front end.

The addition hinged link 8 is formed with an arc-shaped front end 8a which slidably engages the curved taper surface 6a of the weight 6 so that it is normally upwardly disposed, as depicted in FIG. 3, but rotates counterclockwise as the weight 6 advances forward in response to the mechanical shock caused by the vehicle collision as depicted in FIG. 4. Hinged link 8 is also provided, at a side surface of its rear end, with a curved surface 8c. At a middle portion of the hinged link 8 between the arcshaped front end 8a and the rear end having the curved surface 8c, a locking slot 8b is formed such that hinged lever 14 is normally received within the locking slot 8b.

On the other hand, the hinged lever 14 is provided at the rear end thereof with a spring support slot 14a, an acute angular end 14b, and a gently curved end 14c. Also, this hinged lever 14 has a gently curved front end 14d. Hinged lever 14 is biased counterclockwise by means of torsion coil spring 15, of which one end is supported by the spring support slot 14a of the lever 14, and the other end is supported by the seat 11 of the frame 4. Also as shown in FIG. 3, the acute angular end 14b of the lever 14 is normally received within the locking slot 8b of the hinged link 8 when the hinged link 8 is upwardly disposed.

If the movable weight 6 suddenly advances in response to a mechanical shock caused by a vehicle collision, the hinged link 8 turns counterclockwise about its hinged connection 10, and this causes the acute angular end 14b of the hinged lever 14 to be released from the locking slot 8b of the hinged link 8. As a result, the hinged lever 14 turns counterclockwise about its hinge shaft 16 by the torsional force of the coil spring 15, thus causing the curved front end 14d of the hinged lever 14 to slidably push the rounded rear end 19a of the perforating pin 19.

The seat 17 mounted on the frame 4 is provided with a depression 17a in which a protrusion 12a of the gas guide member 12 is received so as to position member 12 mounted on the seat 17. This gas guide member 12 has a center through hole 12b, of which one end has an inner threaded part for effecting airtight engagement with the outer threaded tip of the gas container 13. The other end is connected to an elbow 18 which is in turn connected to the power hose 3. The center through hole 12b of the member 12 coaxially receives the perforating pin 19 which can be axially reciprocated in the through hole 12b so as to perforate the closed tip of the gas container 13 when a vehicle collision occurs.

The perforating pin 19 is provided with rounded rear end 19a, sharp front end 19b, and a middle flange 19c. This perforating pin 19 is received in a cylindrical support 21 in such a manner that the pin 19 is biased by a compression coil spring 20, of which an end is engaged by the middle flange 19c. The cylindrical support 21 is provided with an inner threaded part for engaging an outer threaded front protrusion pipe 12c of the gas guide member 12. This protrusion pipe 12c engages the other end of the compression coil spring 20 when it is received within the cylindrical support 21 and guides the perforating pin 19.

Figure 5:
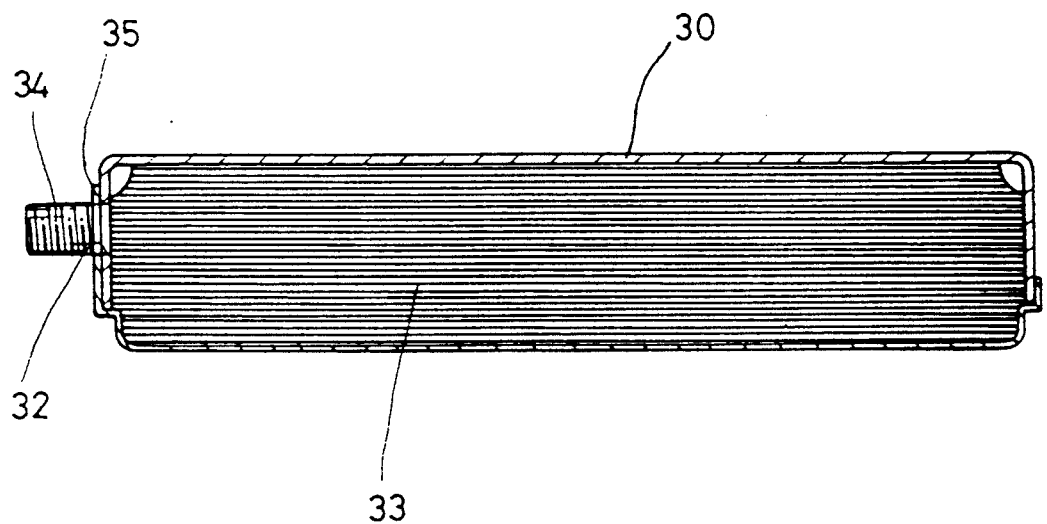
FIG. 5 is a sectioned view of an air bag receiving assembly taken along the section line 5—5 of FIG. 1.

On the other hand, the air bag receiving assembly 2 comprises an outer casing 30, a cover 31, and the air bag 33 which is received in the casing 30 as shown in FIGS. 1 and 5.

The outer casing 30 is provided at an end with a through hole 32 through which a gas inlet pipe 34 of an air bag 33 protrudes to the outside of the outer casing 30. To maintain this gas inlet pipe 34 at its predetermined position, it is preferred to use a lock nut 35 which engages the gas inlet pipe 34 at the front of the through hole 32 of the casing 30.

In stuffing the air bag 33 into the receiving assembly 2, it is required to make this air bag 33 be compactly received in the casing 30 so as to be easily, rapidly and reliably inflated when it is filled with the compressed gas in the case of occurrence of a vehicle collision. To achieve such an arrangement, it is preferred to fold up the air bag 33 neatly and to receive it in the casing 30 in accordance with a conventional manner for folding up a parachute and stuffing the parachute in a parachute bag. In addition, the cover 31 is simply mounted on the under part of the outer casing 30 in such a manner that it is easily separated from the outer casing 30 in the case of a vehicle collision.

The outer casing 30 is also provided at its upper part with a bracket 36 having a plurality of mounting holes so that it is detachably mounted on an inner surface of the vehicle ceiling by means of setting screws. As shown in FIG. 1, the cover 31 is disposed with respect to the outer casing 30 so as to downwardly protrude therefrom so that its front surface looks downwards.

Figure 6:
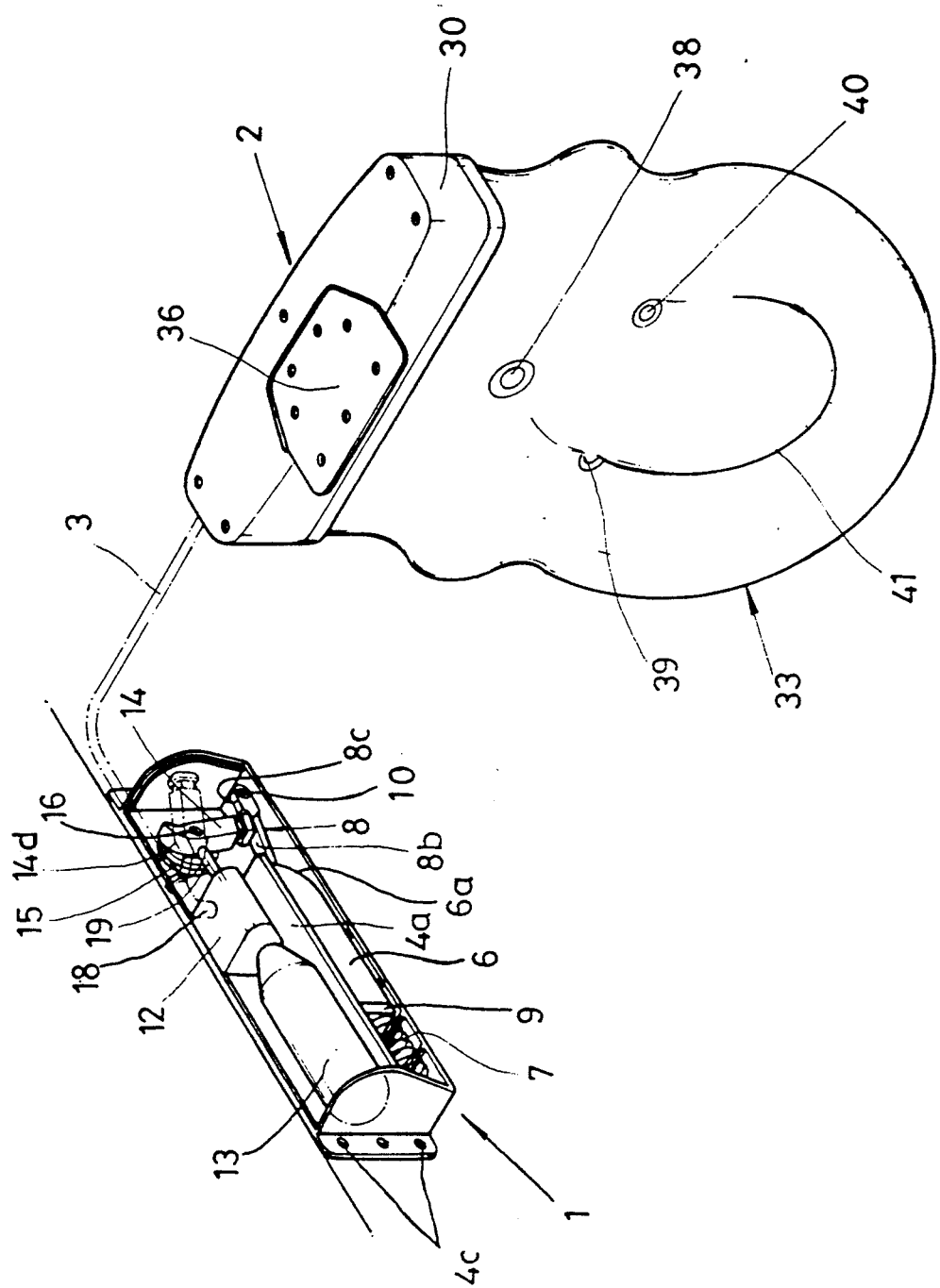
FIG. 6 is a perspective view showing operation of the passenger protector of FIG. 1.

As shown in FIG. 6, showing an inflation of the air bag 33, the air bag 33 is constructed to have a shape which confirms to a human body by forming a twofold pocket bag which is provided with an upper junction point 38, a pair of middle junction points 39 and 40, and a U-shaped junction line 41 which is formed between the middle junction points 39 and 40. By virtue of the aforementioned characteristic shape of air bag 33, the head of a passenger is protected by an inflated part around the upper junction point 38 while the upper body of the passenger is covered with the other inflated part around the middle junction points 39 and 40 and the U-shaped junction line 41 as the air bag 33 is rapidly filled with the compressed gas which blows into the bag 33 through the gas inlet pipe 34 when there occurs the vehicle collision.

Hereinafter, the operational effect of the passenger protector having the aforementioned construction will be described in detail.

A pair of passenger protectors of this invention are preferably installed one at each inner corner of the ceiling 43 of the vehicle body 42 forward of the front seats of the vehicle as depicted in FIG. 7. However, the position at which this passenger protector is installed is not limited by the above description. With reference to FIG. 7, the compressed gas supply assembly 1 is mounted on an appropriate position of the ceiling 43 above the passenger seat in such a manner that the movable weight 6 is axially disposed for movement in the longitudinal direction of the vehicle body 42 so as to inertially advance when a vehicle collision occurs, while the air bag receiving assembly 2 is mounted on a front upper position above the passenger seat.

If a sudden collision occurs during a running of the vehicle, the vehicle is suddenly reduced in its speed, and this causes the movable weight 6 to inertially advance forwards or to advance forwards as a result of being biased by the support spring 7 which is instantaneously compressed and expands due to the mechanical shock caused by the vehicle collision. As the movable weight 6 advances forwards as described above, the curved taper surface 6a of the weight 6 makes the arc-shaped front end 8a of the hinged link 8 be pushed in a manner to cause the hinged link 8 to be turned counterclockwise about its hinged connection 10.

As the hinged link 8 is turned counterclockwise about the hinged connection 10, the acute angular end 14b of the hinged lever 14 is released from the locking slot 8b of the hinged link 8. As a result, the hinged lever 14 is also turned counterclockwise about the hinge shaft 16 by the torsional force of the torsion coil spring 15, thus causing the curved front end 14d thereof to push the rounded rear end 19a of the perforating pin 19. The perforating pin 19 advances toward the closed tip of the gas container 13 simultaneously compressing the compression coil spring 20, thereby perforating the closed tip of the gas container 13 and permitting the compressed gas in the container 13 to be ejected from the container 13. After perforating the tip of the container 13, the perforating pin 19 rapidly returns to its original position by virtue of the return force of the compression coil spring 20.

The compressed gas ejected from the gas container 13 is rapidly channeled through hole 12b of the gas guide member 12, the elbow 18, which is fluid communication with hole 12b and, the power hose 3. This compressed gas in turn inflates the air bag 33 through the gas inlet pipe 34 to define an inflated outer shape of the air bag 33 which is coincident with the human body. As described above, the cover 31 is simply inserted in the lower part of the outer casing 30 so as to easily detach therefrom when it is opened downwardly Therefore, as the air bag 33 is filled with the compressed gas so as to be expanded to define its inflated outer shape, the cover 31 is urged downwardly by the inflating air bag 33 and easily separated from the outer casing 30 and the outer casing 30 is provided with a lower opening through which the air bag 33 descends from the outer casing 30.

Simultaneously with being filled with the compressed gas in the aforementioned manner, the air bag 33 descends from the outer casing 30 through the lower opening of the casing 30 so as to be positioned at the front of the passenger or to be interposed between the passenger and an interior object disposed at the front of the passenger (for example, in the case of the passenger protector equipped for protecting a driver, the descended air bag 33 is interposed between the driver and a steering wheel).

As a result, the air bag 33 which is filled with the compressed gas and interposed between the passenger and the interior of the vehicle can efficiently prevent the head and the upper body of the passenger from being directly struck by the interior objects of the vehicle due to the inertial force caused by a sudden reduction of the vehicle running speed when a vehicle collision occurs.

As a result of a practical test wherein a collision was staged in a vehicle which had run at a speed of 40 km/h, it is known that the passenger protector of this invention accomplished its operation. Operation of the protector started as the movable weight 6 inertially advanced forward in response to a mechanical shock caused by the vehicle collision so as to cause the hinged link 8, the hinged lever 14 and the perforating pin 19 to be sequentially operated. In consequence the air bag 33 descended from the outer casing 30 and became positioned in front of the passenger with the compressed gas having filled the air bag 33 so as to define an inflated outer shape coincident with the shape of the human body. This occurred within the time range of 0.05 to 0.1 seconds.

Figure 8:
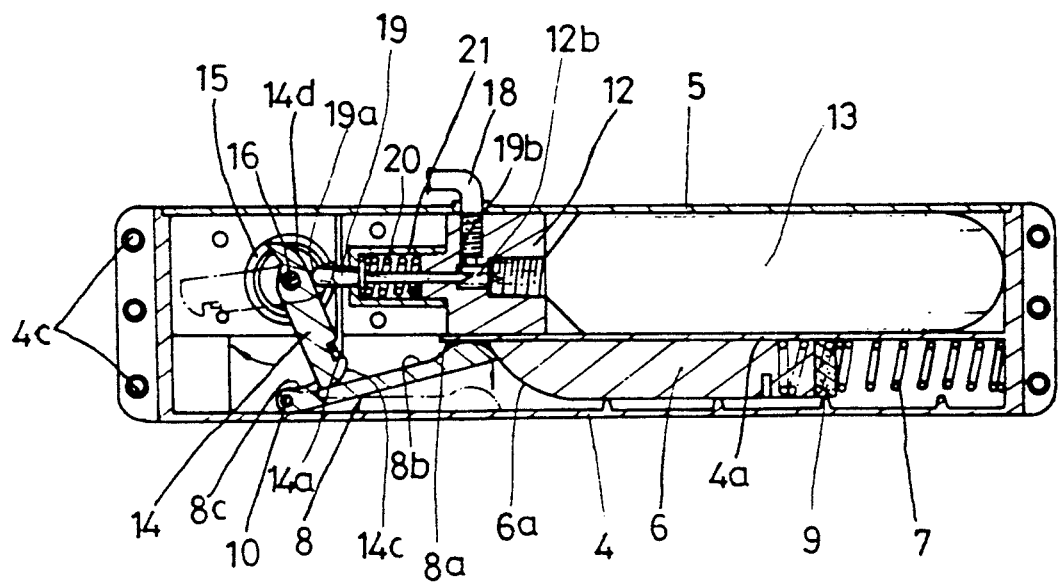
FIG. 8 is a view corresponding to FIG. 2, but showing a second, alternate embodiment of a compressed gas supplying assembly of the present invention.

FIG. 8 shows a second, alternate embodiment of a compressed gas supplying assembly 1 of the passenger protector of this invention. In this second, alternate embodiment, the general construction of the assembly 1 remains the same as in the primary embodiment, but the arrangement of the component parts is changed to be generally symmetrical to that of the primary embodiment. Therefore, the detailed description of this second, alternate embodiment can be efficiently omitted.

Figure 9:
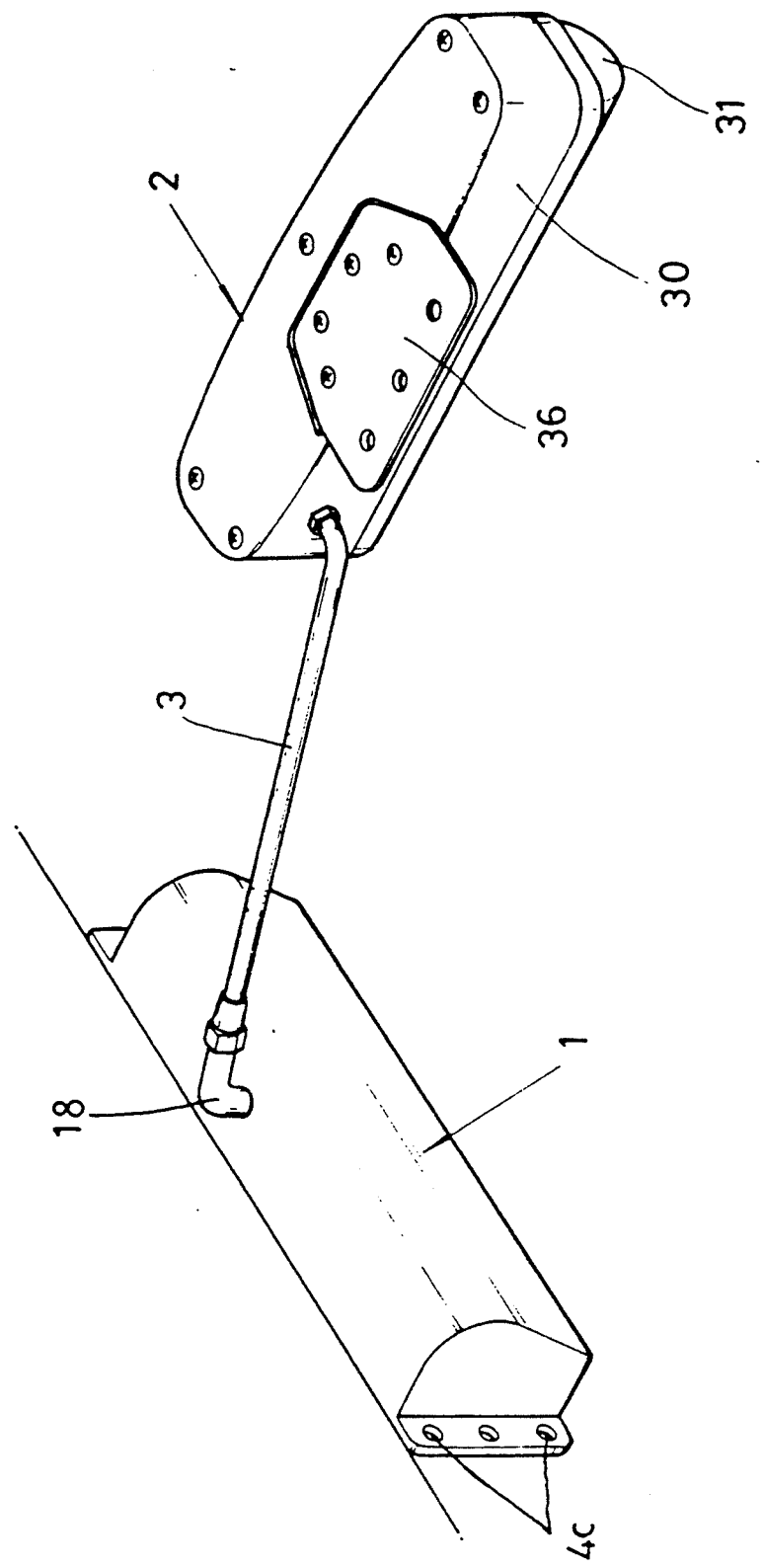
FIG. 9 is a plan view corresponding to FIG. 1, but showing another embodiment of a passenger protector of the present invention.
Figure 10:
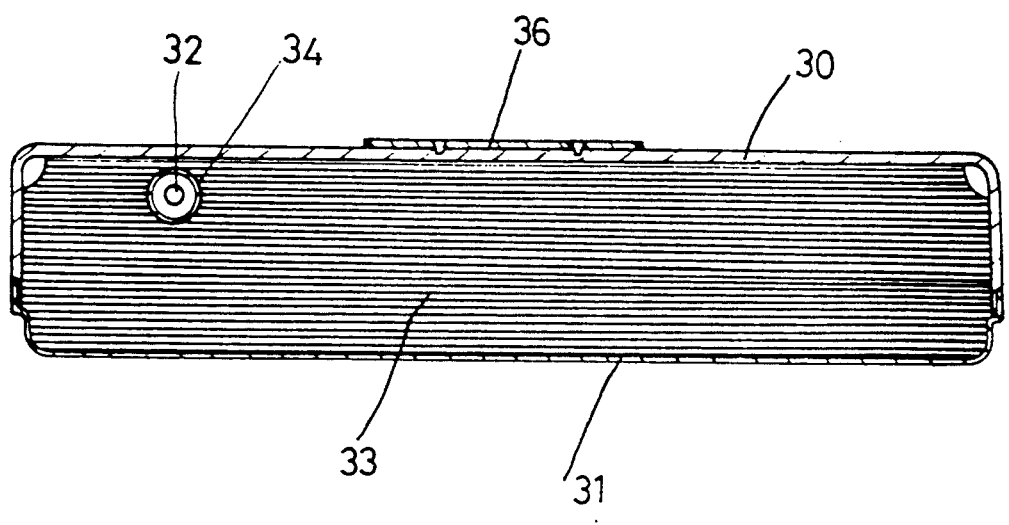
FIG. 10 is a view corresponding to FIG. 5, but showing a second, alternate embodiment of an air receiving assembly installed in the passenger protector of FIG. 9.
Figure 11:
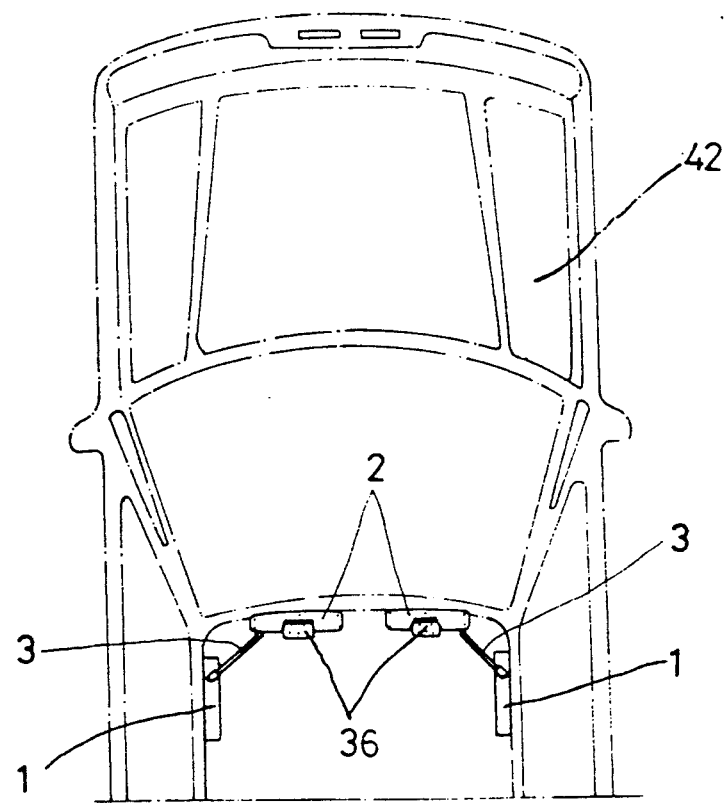
FIG. 11 is a plan view showing an example of installation of the passenger protector of FIG. 9 in a vehicle.

Turning to FIGS. 9 to 11 showing another embodiment of the passenger protector of this invention, the air inlet pipe 34 of the air bag 33 may be allowed to protrude from a front surface of the outer casing 30. In this case, the power hose 3, through which the compressed gas flows from the gas supplying assembly 1 to the air bag 33, is relatively shortened in its length so that it provides an advantage in that the time for full filling of the air bag 33 with the compressed gas is desirably shortened.

However, it is noted that the embodiment shown in FIGS. 9 to 11 has a general construction remaining the same as in the primary embodiment shown in FIG. 1 except for the relatively shortened power hose 3, and can be installed in the interior of the vehicle in the same manner as described in conjunction with FIG. 7 (see FIG. 11).

Figure 12:
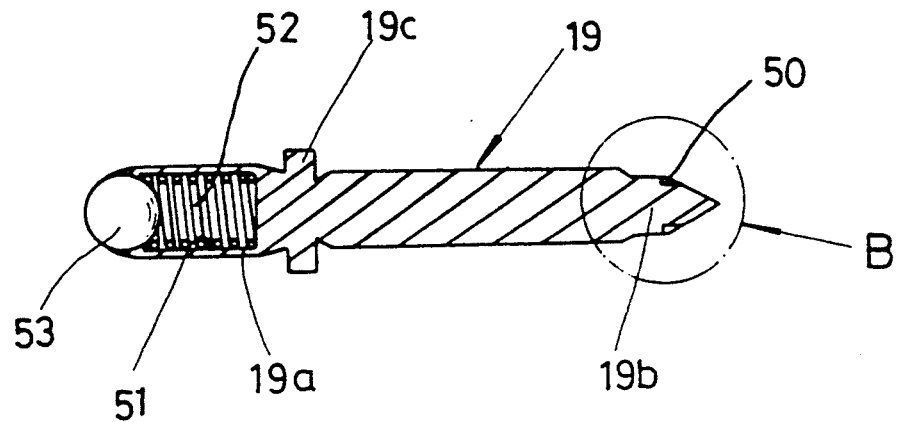
FIG. 12 is a longitudinal sectioned view of a second, alternate embodiment of a perforating pin in accordance with the present invention.
Figure 13:
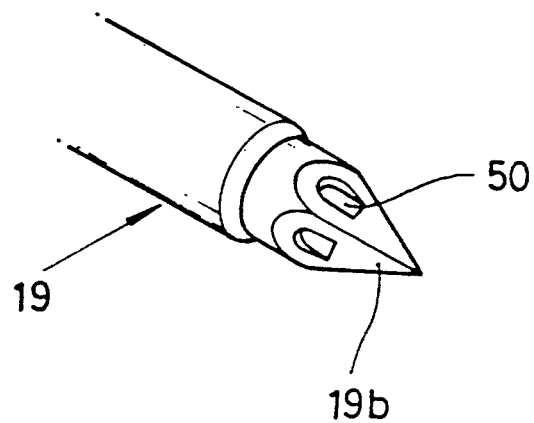
FIG. 13 is an enlarged view of the structure within circle B of FIG. B of FIG. 12.

In FIGS. 12 and 13 showing a second alternate embodiment of a perforating pin 19, the perforating pin 19 may be constructed to have a sharp front end 19b which has a plurality of slots 50, each formed in a corresponding taper surface of the end 19b. In addition, at the rear end 19a of the perforating pin 19, the pin 19 may have a center cylindrical depression 51 which is axially formed, and in which a ball 53 is slidably received at the entrance thereof so as to normally remain in the position shown with a compression coil spring 52 disposed in the depression 51 so as to outwardly bias the ball 53.

Therefore, when the sharp front end 19b of the perforating pin 19 advances into, and perforates, the closed tip of the gas container 13 as the rear end 19a of the pin 19 is pushed by the curved front end 14d of the hinged lever 14, the compressed gas in the gas container 13 acts in combination with the slots 50 of the sharp front end 19b and, in cooperation with the return force of the compression coil spring 20, permits the perforating pin 19 to rapidly return to its original position as soon as possible. The time the perforating pin 19 remains at the tip of the gas container 13 after it perforates the tip is, thereby shortened.

On the other hand, the ball 53 causes the curved front end 14d of the hinged lever 14 to come into contact therewith when the end 14d pushes the rear end 19a of the perforating pin 19, thereby smoothly compressing the spring 52 and causing the perforating pin 19 to advance toward the closed tip of the gas container 13.

Figure 14:
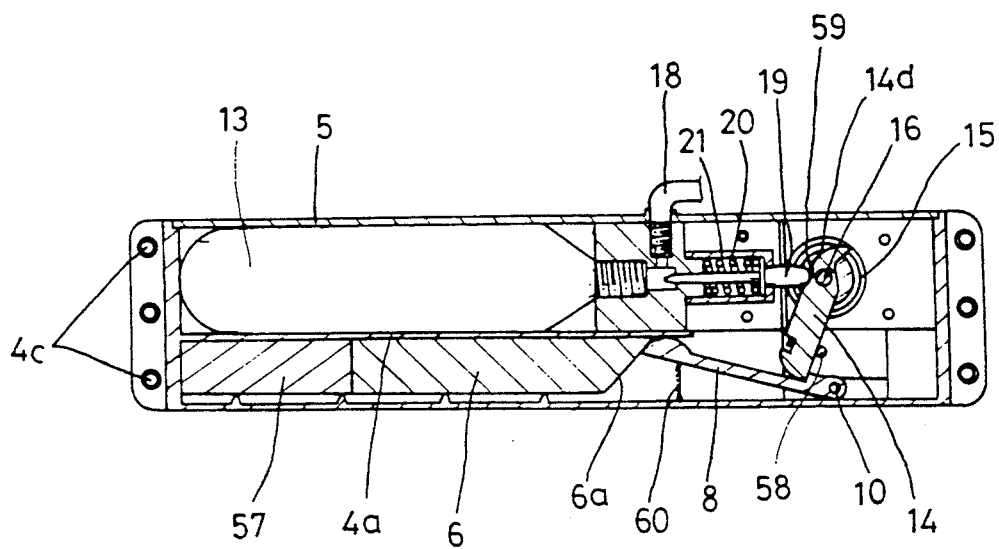
FIGS. 14 to 17 ate views similar to FIG. 2, but showing the other embodiments of a compressed gas supplying assembly in accordance with the present invention.
Figure 15:
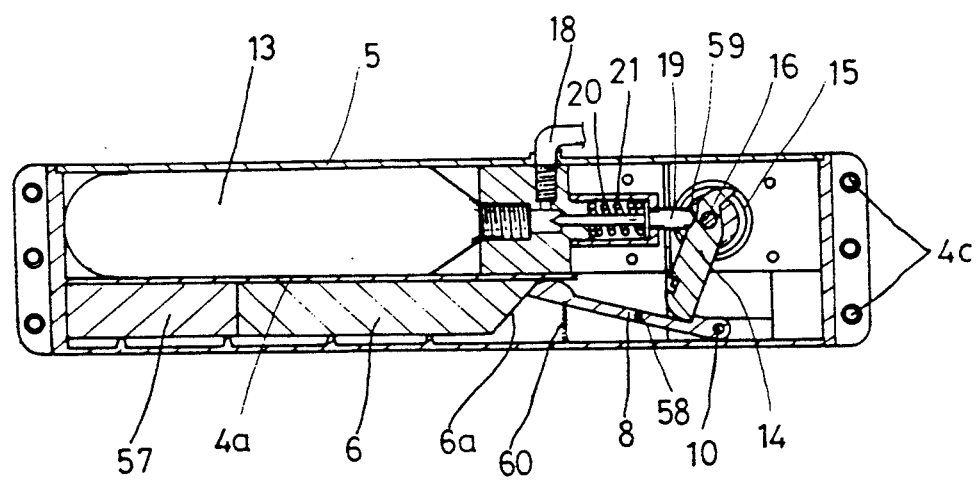

Turning to FIGS. 14 and 15 showing third and fourth alternate embodiments of a compressed gas supplying assembly 1 of this invention, the assembly 1 is provided with a fixed rubber member 57, instead of the coil spring 7, which is disposed at the back of the movable weight 6, thereby causing the weight 6 not to move backwards from its normal position but to advance forwards. In addition, the hinged link 8 is upwardly biased by a compression coil spring 60 which is connected at an end to the link 8 and at the other end to the outer frame 4 of the assembly 1. Furthermore, the hinged lever 14, which is received at its rear end in the locking slot 8b of the hinged link 8 as described above, is supported by a safety pin 58. The pin 58 is inserted from the outside of the cover 5 so as to be disposed at a side surface of the hinged lever 14, in order to normally maintain its position as shown in FIG. 14. On the other hand, the safety pin 58 may be disposed so as to support the hinged link 8 as shown in FIG. 15. In the embodiments shown in FIGS. 14 and 15, the hinged lever 14 is also formed as having a curved surface 59 with which the rounded rear end 19a or the slide ball 52 of the perforating pin 19 comes into slidable contact.

This safety pin 58 is adapted to prevent the passenger protector of this invention from being inadvertently operated due to a careless application of a mechanical shock thereto during a handling evolution thereof before installation in a vehicle. Thus, after the installation of the passenger protector in the vehicle is accomplished, the safety pin 58 must be removed from the protector.

In the case of passenger protectors shown in FIGS. 14 and 15, if a vehicle collision occurs, the movable weight 6 inertially advances forwards, and this causes the hinged link 8 to be turned counterclockwise about its hinged connection 10 simultaneously compressing the compression coil spring 60. As a result, in the same manner as described above, the hinged lever 14 is then turned counterclockwise about its hinge shaft 16, thereby causing its curved surface 59 to slidably push the rounded rear end 19a of the perforating pin 19.

The rounded rear end 19a of the perforating pin 19 comes into slidable contact with the curved surface 59 of the hinged lever 14 so that it is smoothly slidably pushed by the curved surface 59 when the hinged lever 14 is turned counterclockwise.

Figure 16:
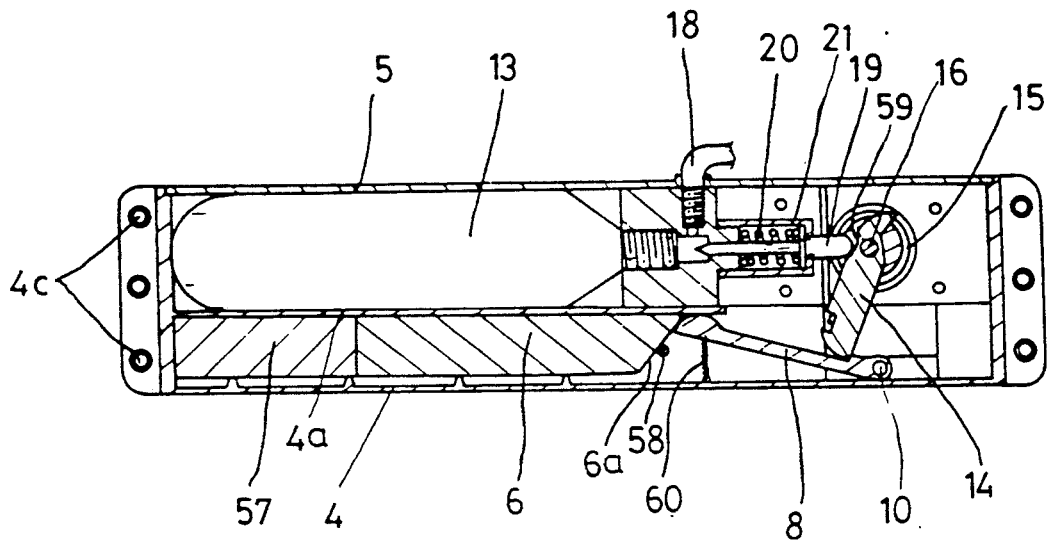
Figure 17:
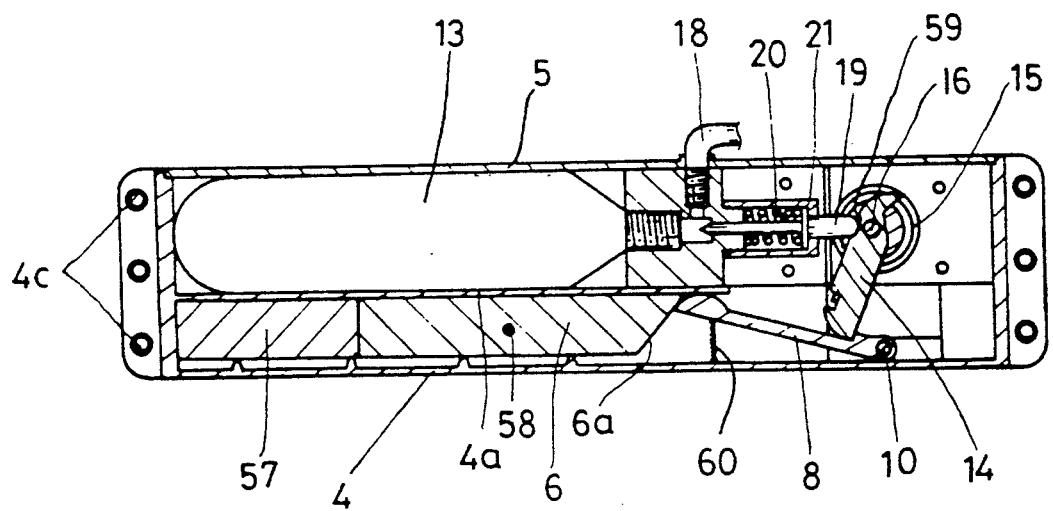

As depicted in FIGS. 16 and 17, the safety pin 58 may be disposed so as to prevent the movable weight 6 from inadvertently advancing. To achieve such an arrangement, the pin 58 is disposed in such a manner that it comes into contact with the tapered surface 6a of weight 6 as shown in FIG. 16 or it is inserted in a through hole which is formed in the weight 6 as shown in FIG. 17. Of course, as discussed above, these safety pins 58 must be removed from the protector after installing the passenger protector in a vehicle.

As described above, the present invention provides an air bag type of passenger protector equipped in a vehicle. The passenger protector comprises a compressed gas supplying assembly, which is provided with a compressed gas container, a movable weight, a hinged link, a hinged lever, and a perforating pin, an air bag receiving assembly for receiving an air bag which is connected to the air supplying assembly by means of a power hose. If a vehicle collision occurs the weight is reliably operated in response to a mechanical shock caused by the vehicle collision, and this causes the hinged link and the hinged lever to be sequentially rotated which in turn, causes the perforating pin to be pushed so as to perforate a closed tip of the compressed gas container. As the closed tip of the gas container is perforated by the perforating pin, the compressed gas rapidly exits the gas container and passes into an air bag having an inflated outer shape which is coincident with the human body by forming an upper junction point, a pair of middle junction points and a U-shaped junction line, thereby efficiently preventing the passenger from being directly struck by a vehicle body component and, in this respect, protecting the passenger from being injured.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An air bag type of passenger protector, comprising:
   (a) a compressed gas supplying assembly for supplying a compressed gas for an air bag, said gas supplying assembly including:
      (i) an outer frame on which a partition is mounted so as to divider an interior of said frame into two inner spaces;
      (ii) a frame cover for covering said outer frame;
      (iii) a moveable weight for automatically moving in an axial direction aligned with a direction of movement of a vehicle on which the passenger protector is installed in response to a mechanical shock caused by a vehicle collision, said weight being axially received in an inner space of the frame so as to inertially move forward in response to the mechanical shock and being supported by a support member disposed at a back of said weight;
      (iv) a compressed gas container containing a compressed gas;
      (v) a compressed gas guide member for guiding compressed gas ejected from said gas container to the air bag, said gas guide member being mated, at an end thereof, with a closed tip of the gas container;
      (vi) a perforating pin for perforating said closed tip of the gas container in response to the inertial movement of the moveable weight, said perforating pin being axially disposed so as to allow its front end to be oriented toward the closed tip of the gas container;
      (vii) a hinged lever for pushing the perforating pin to cause the pin to perforate the closed tip of the gas container, said hinged lever having an end in continuous engagement with a rear end of the perforating pin, said hinged lever being biased by a first biasing member wherein it is pivoted about a hinged shaft to which it is mounted when the moveable weight moves inertially;
      (viii) a hinged link for causing, in response to inertial movement of the moveable weight, the hinged lever to be pivoted about its hinge shaft so as to effect pushing of the perforating pin into said closed tip of the gas container, said hinged link being hinged to a seat of the outer frame so as to be turned about a hinged connection, at a front end thereof, into slidable contact along a front end of the moveable weight, and to enable the other end of the hinged lever to be normally received within a middle recess of said hinged link; and
      (ix) wherein said hinged lever includes a curved portion in engagement with said rear end of the perforating pin, an end opposite said end in engagement with the rear end of the perforating pin, said opposite end having an acute angular portion being normally received within the middle recess of the hinged link, and said opposite end further having a gently curved portion formed, together with said acute angular portion at said opposite end of said hinged lever; and (b) an air bag receiving assembly for holding the air bag in a deflated state, said air bag receiving assembly including:
  (i) an outer casing having a through hole through which a gas inlet pipe of the air bag, connected to the compressed gas supply assembly by means of a hose through which the compressed gas is supplied from the compressed gas applying assembly to the air bag, extends to the outside of said outer casing; and
  (ii) a cover for covering the outer casing in such a manner wherein it is easily separated from the outer casing when the air bag is filled with the compressed gas.

2. An air bag type of passenger protector according to claim 1, wherein said hinged lever further comprises a curved surface with which said rear end of the perforating pin comes into slidable contact.

3. An air bag type of passenger protector, comprising:
(a) a compressed gas supplying assembly for supplying a compressed gas for an air bag, said gas supplying assembly including:
  (i) an outer frame on which a partition is mounted so as to divide an interior of said frame into two inner spaces;
  (ii) a frame cover for covering said outer frame;
  (iii) a moveable weight for automatically moving in an axial direction aligned with a direction of movement of a vehicle on which the passenger protector is installed in response to a mechanical shock caused by a vehicle collision, said weight being axially received in an inner space of the frame so as to inertially move forward in response to the mechanical shock and being supported by a support member disposed at a back of said weight;
  (iv) a compressed gas container containing a compressed gas;
  (v) a compressed gas guide member for guiding compressed gas ejected from said gas container to the air bag, said gas guide member being mated, at an end thereof, with a closed tip of the gas container;
  (vi) a perforating pin for perforating said closed tip of the gas container in response to the inertial movement of the moveable weight, said perforating pin being axially disposed so as to allow its front end to be oriented toward the closed tip of the gas container;
  (vii) a hinged lever for pushing the perforating pin to cause the pin to perforate the closed tip of the gas container, said hinged lever having an end in continuous engagement with a rear end of the perforating pin, said hinged lever being biased by a first biasing member wherein it is pivoted about a hinge shaft to which it is mounted when the moveable weight moves inertially;
  (viii) a hinged link for causing, in response to inertial movement of the moveable weight, the hinged lever to be pivoted about its hinge shaft so as to effect pushing of the perforating pin into said closed tip of the gas container, said hinged link being hinged to a seat of the outer frame so as to be turned about a hinged connection, at a front end thereof, into slidable contact along a front end of the moveable weight, and to enable the other end of the hinged lever to be normally received within a middle recess of said hinged link; and
  (ix) wherein said gas guide member includes a protrusion received in a depression of a seat of the frame so as to cause the gas guide member to be mounted on this seat, a protrusion pipe for guiding said perforating pin, a center through hole having an end in engagement with the closed tip of the gas container and another end extending to said protrusion pipe, and an elbow connected to the end of the center through hole which extends to said protrusion pipe and, in turn, to said power hose;
(b) an air bag receiving assembly for holding the air bag in a deflated state, said air bag receiving assembly including:
  (i) an outer casing having a through hole through which a gas inlet pipe of the air bag, connected to the compressed gas supply assembly by means of a hose through which the compressed gas is supplied from the compressed gas applying assembly to the air bag, extends to the outside of said outer casing; and
  (ii) a cover for covering the outer casing in such a manner wherein it is easily separated from the outer casing when the air bag is filled with the compressed gas.

4. An air bag type of passenger protector, comprising:
(a) a compressed gas supplying assembly for supplying a compressed gas for an air bag, said gas supplying assembly including:
  (i) an outer frame on which a partition is mounted so as to divide an interior of said frame into two inner spaces;
  (ii) a frame cover for covering said outer frame;
  (iii) a moveable weight for automatically moving in an axial direction aligned with a direction of movement of a vehicle on which the passenger protector is installed in response to a mechanical shock caused by a vehicle collision, said weight being axially received in an inner space of the frame so as to inertially move forward in response to the mechanical shock and being supported by a support member disposed at a back of said weight;
  (iv) a compressed gas container container a compressed gas;
  (v) a compressed gas guide member for guiding compressed gas ejected from said gas container to the air bag, said gas guide member being mated, at an end thereof, with a closed tip of the gas container;
  (vi) a perforating pin for perforating said closed tip of the gas container in response to the inertial movement of the moveable weight, said perforating pin being axially disposed so as to allow its front end to be oriented toward the closed tip of the gas container;
  (vii) a hinged lever for pushing the perforating pin to cause the pin to perforate the closed tip of the gas container, said hinged lever having an end in continuous engagement with a rear end of the perforating pin, said hinged lever being biased by a first biasing member wherein it is pivoted about a hinge shaft to which it is mounted when the moveable weight moves inertially;
  (viii) a hinged link for causing, in response to inertial movement of the moveable weight, the hinged lever to be pivoted about its hinge shaft so as to effect pushing of the perforating pin into said closed tip of the gas container, said hinged link being hinged to a seat of the outer frame so as to be turned about a hinged connection, at a front end thereof, into slidable contact along a front end of the moveable weight, and to enable the other end of the hinged lever to be normally receiving within a middle recess of said hinged link; and (ix) wherein a rear end of the perforating pin is provided with a center cylindrical depression in which a ball is slidably received and retained in a position in which it is biased by a second biasing member, and wherein said front end of the perforating pin is provided with a plurality of slots;

(b) an air bag receiving assembly for holding the air bag in a deflated state, said air bag receiving assembly including:
  (i) an outer casing having a through hole through which a gas inlet pipe of the air bag, connected to the compressed gas supply assembly by means of a hose through which the compressed gas is supplied from the compressed gas applying assembly to the air bag, extends to the outside of said outer casing, and
  (ii) a cover for covering the outer casing in such a manner wherein it is easily separated from the outer casing when the air bag is filled with the compressed gas.

5. An air bag type of passenger protector according to claim 4, wherein said hinged lever further comprises a curved surface with which said ball of the perforating pin comes into slidable contact.

* * * * *